US005333374A

United States Patent [19]

Pittau

[11] Patent Number: 5,333,374

[45] Date of Patent: Aug. 2, 1994

[54] DEVICE FOR CONNECTING CONNEXION ELEMENTS INTO CONNECTORS

[75] Inventor: Serge F. Pittau, Aubagne, France

[73] Assignee: Societe Nationale Industrielle et Aerospatiale, Paris, France

[21] Appl. No.: 945,623

[22] Filed: Sep. 16, 1992

[30] Foreign Application Priority Data

Sep. 26, 1991 [FR] France ................................ 91 11867

[51] Int. Cl.[5] ........................................... B23P 19/04

[52] U.S. Cl. ................................... 29/748; 29/33 M

[58] Field of Search .............. 29/33 M, 747, 748, 749, 29/754, 755, 759

[56] References Cited

U.S. PATENT DOCUMENTS

| | | | |
|---|---|---|---|
| 3,939,552 | 2/1976 | Hart et al. | 29/748 X |
| 4,265,503 | 5/1981 | Baur . | |
| 4,757,606 | 7/1988 | Eaton | 29/754 X |
| 4,837,926 | 6/1989 | Boutcher, Jr. | 29/747 |
| 4,967,470 | 11/1990 | Folk | 29/747 |
| 5,109,602 | 5/1992 | Fukuda et al. | 29/759 X |

FOREIGN PATENT DOCUMENTS 0041332 5/1981 European Pat. Off. .

*Primary Examiner*—Peter Dungba Vo

*Attorney, Agent, or Firm*—Fisher, Christen & Sabol

[57] ABSTRACT

The invention relates to a device for connecting connexion elements equipping the ends of electrical conductors into connector housings, as well as to an automatic connexion machine.

The device (5) comprises:

- a body (7) which can be displaced in the direction of said connector (4);
- an insertion member (8) provided with means for grasping said connexion element (2) to be inserted into the corresponding housing of the connector (4);
- removable means for fixing said insertion member (8) to said body (7); and,
- means for controlling said grasping means, associated with said body (7) and capable of assuming, when said insertion member (8) is locked, a first position, in which said grasping means hold said connexion element (2) and enable it to be inserted into the corresponding housing of the connector, and a second position, in which the grasping means release said connexion element which is then connected in the connector housing.

13 Claims, 8 Drawing Sheets

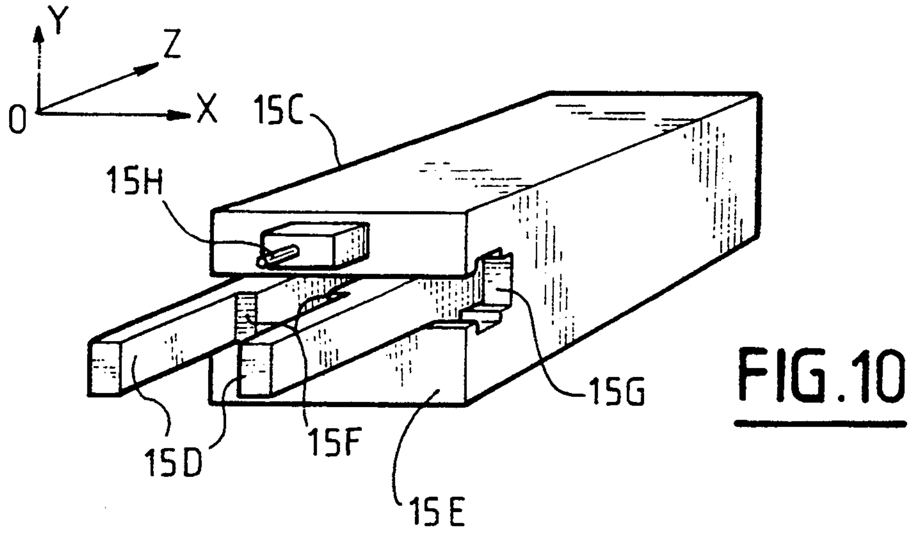
FIG.10
FIG.9
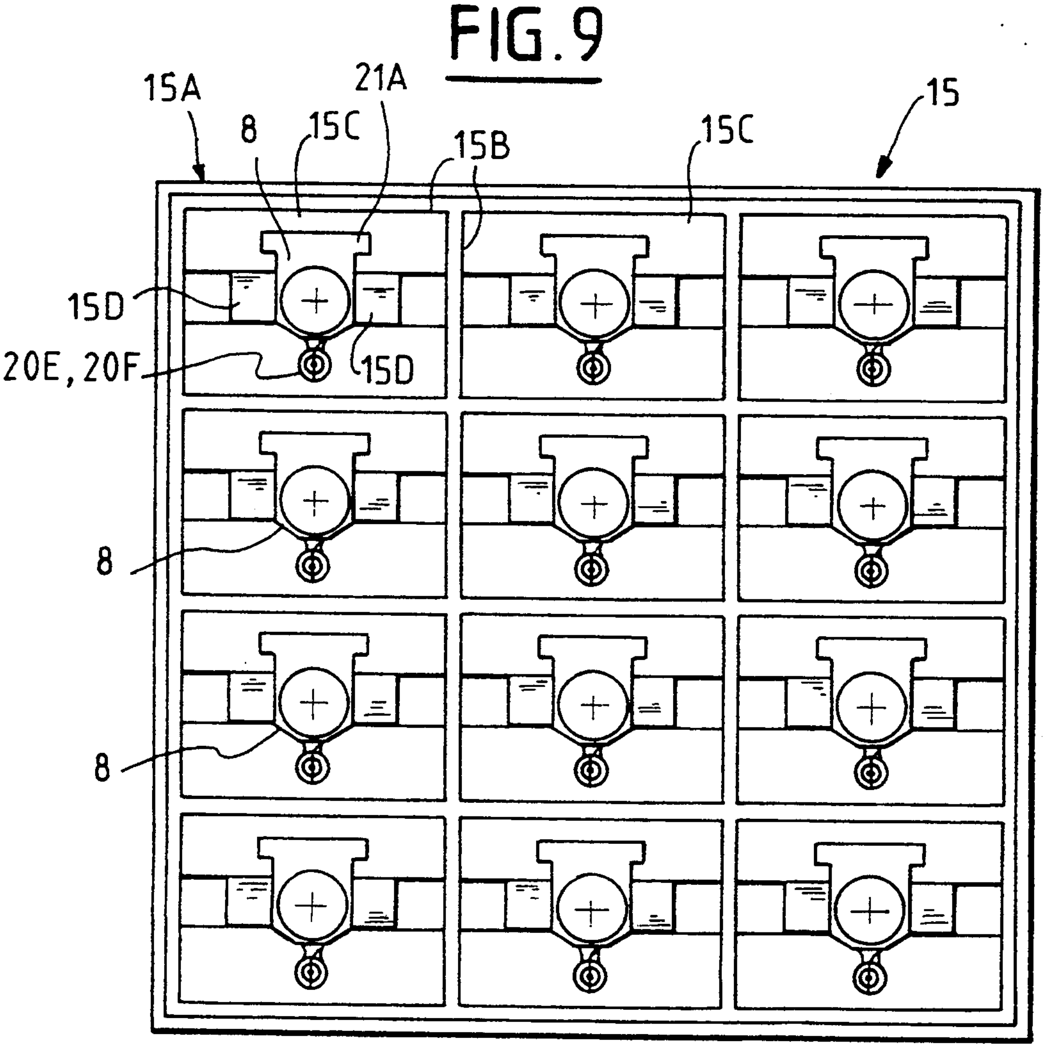

FIG.12
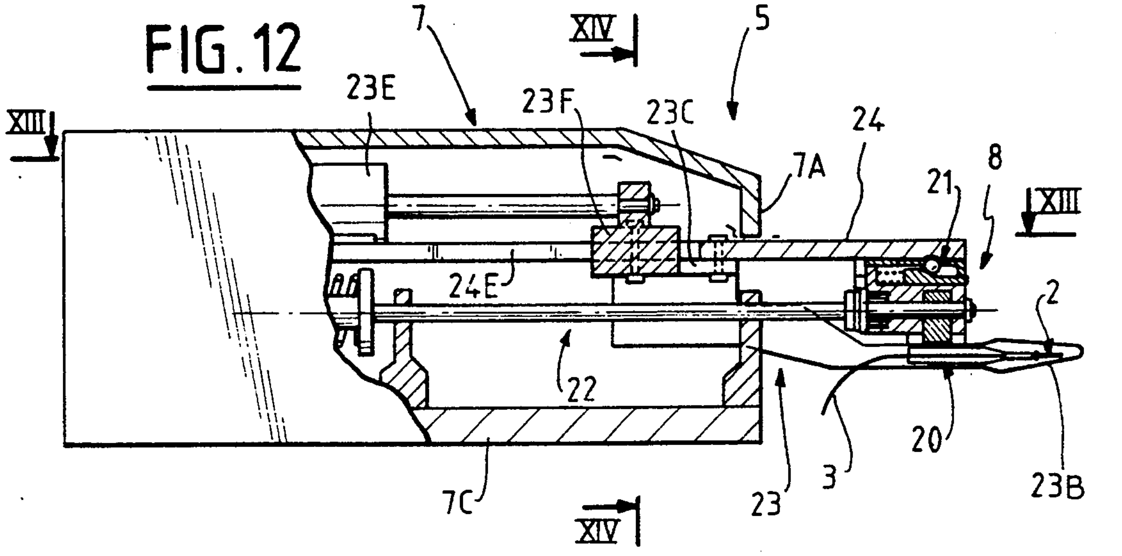
FIG.13
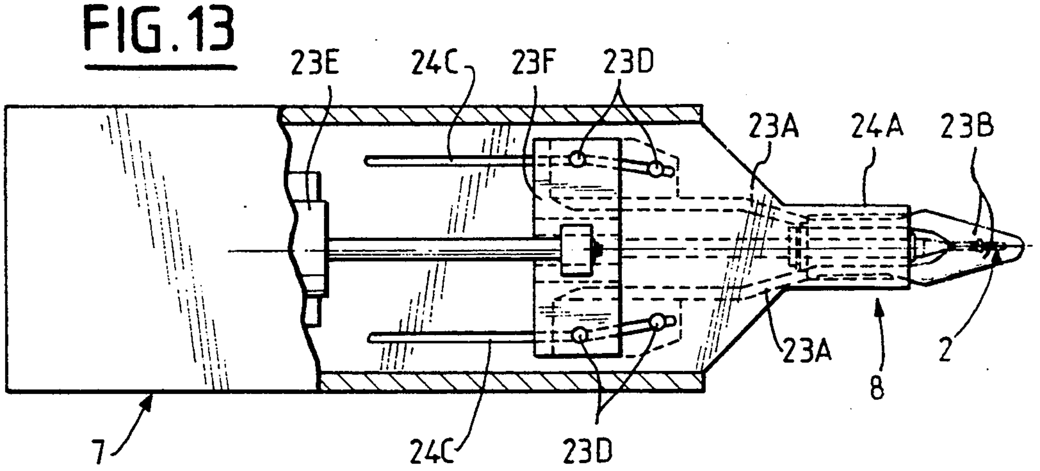
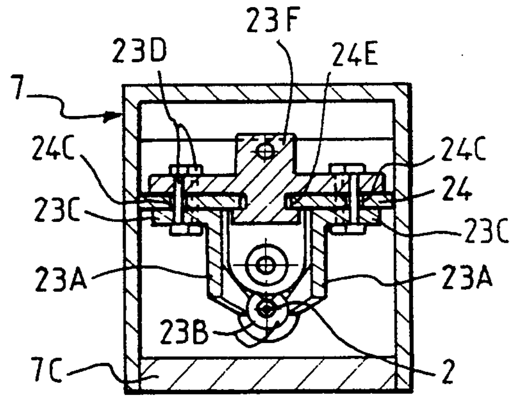
FIG.14

FIG.15A
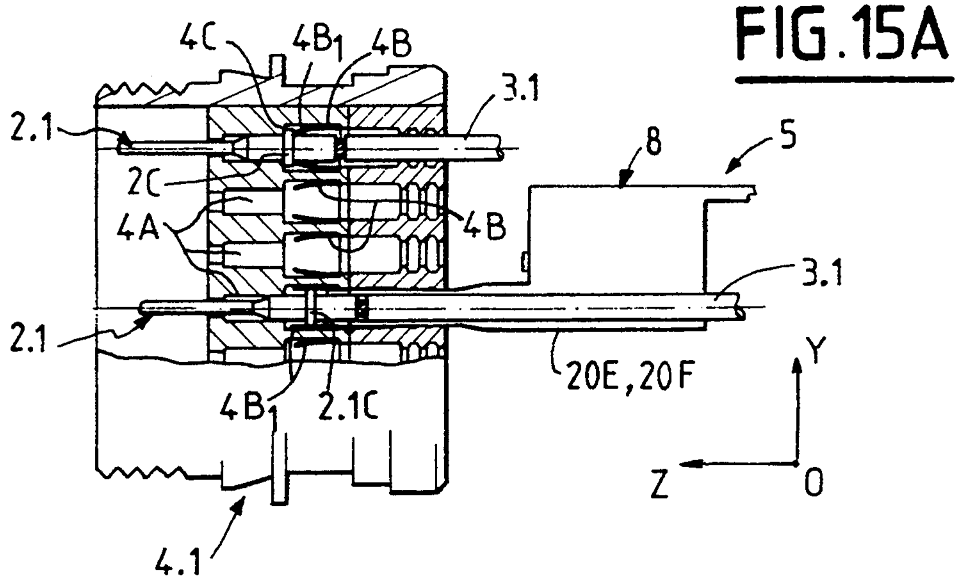
FIG.15B
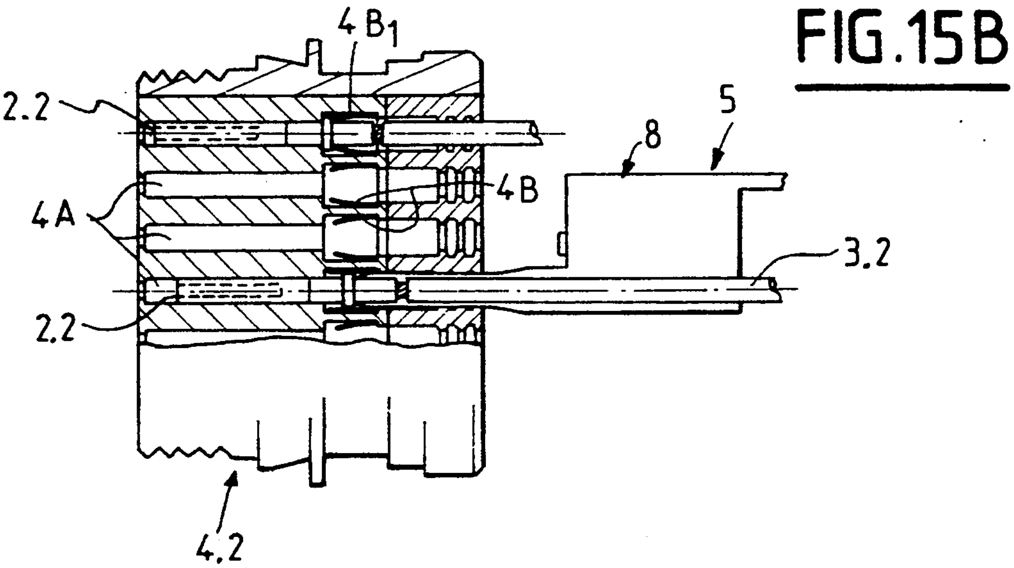
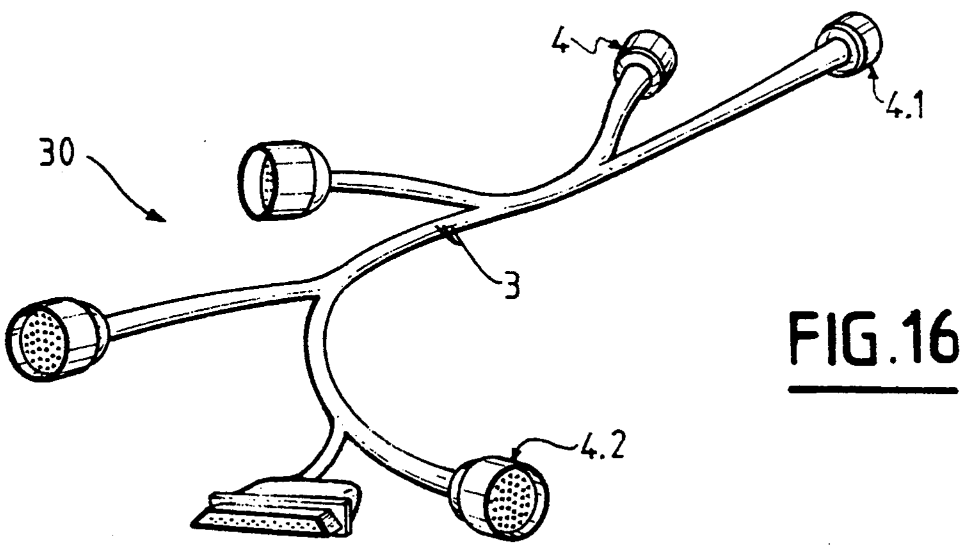
FIG.16

DEVICE FOR CONNECTING CONNEXION ELEMENTS INTO CONNECTORS

BACKGROUND OF THE INVENTION

1. Field Of The Invention

The present invention relates to a device for connecting connexion elements equipping the ends of electrical conductors, into connector housings, as well as to an automatic connexion machine comprising such devices.

The device according to the invention is more particularly intended for the plugging of male and/or female pins, which have previously been mounted, usually by crimping, onto the ends of the conductors of electrical cables, into the corresponding reception housings of connectors, which may have a circular, rectangular or other shape and in which the operation of plugging or of connexion of the pins usually takes place via their rear face.

2. Background Art

Furthermore, such a connexion device and the machine which is equipped therewith have a preferred application in the aeronautical field. Indeed, the vast number of electrical cables, intended to join up the various apparatuses and items of equipment of the aircraft, via specific connectors, in order to ensure that it functions correctly, involves many preliminary operations for connecting the pins, at the ends of the conductors of said cables, into corresponding housings of the specific connectors so as subsequently to make up cabling bundles or harnesses.

The connectors of each bundle, equipped with pins, are then engaged into complementary connectors provided on the items of equipment.

It goes without saying that the device and the connexion machine according to the invention could apply to other industrial fields, for example the automotive industry, wherever these involve many connexions between connexion elements and connectors.

At present, the operations of connexion of such connexion elements, such as male and female pins, into connector housings are carried out manually by means of ordinary insertion tools. For example, an operator installs one of the two pins, which have been previously crimped to the ends of the conductor of said electrical cable, into the axial passage of said insertion tool until the rib, which is provided on each pin, presses against the end face of the tool. The pin, held inside the tool, is then inserted into the corresponding housing of the connector in question, in such a way that the rib of the pin comes to bear against an internal shoulder in the housing while being, moreover, axially locked by the elastic tabs of a socket usually provided inside the housing.

The operator then removes the tool, now without the pin, and can proceed to install the other pin of the cable into the corresponding housing of another connector, with the same or a different tool.

It is therefore clear that a lengthy and tedious task must be undertaken in order to connect all the connexion elements into the corresponding housings of the specific connectors, in order to produce each cabling bundle. These connexion operations therefore require a large technical staff and considerable working time.

Furthermore, depending particularly on the intensity of the electrical currents and on the shape of the connectors and their housings, a plurality of connexion elements such as male or female pins, having different geometrical characteristics (shape, length, diameter, . . . ) are used, which involves the use of many specific insertion tools, each corresponding to a particular type of connexion element. Consequently, the risk of errors occurring, due to a wrong choice of pin, of insertion tool, of connector housing, or even of connector, is not negligible. Therefore, in order to prevent these possible errors which could have serious consequences, further checking operations are to be carried out in order to ensure that each pin equips the corresponding housing of the connector in question, and that the pins are properly connected and held inside the housings of said connectors.

DETAILED DESCRIPTION OF THE INVENTION

The aim of the present invention is to remedy these disadvantages and it relates to a connexion device, the design of which makes it possible to facilitate the various operations of inserting the connexion elements into the connector housings and, consequently, to reduce the time needed to mount these elements.

For this purpose, the device for connecting connexion elements, such as pins, equipping the ends of electrical conductors, into connector housings, is noteworthy, according to the invention, in that it comprises:

- a body which can be displaced in the direction of said connector;
- at least one insertion member provided with means for grasping said connexion element to be inserted into the corresponding housing of the connector;
- removable means for fixing said insertion member to said body, allowing the locking or unlocking of said member relative to said body; and,
- means for controlling said grasping means, associated with said body and capable of assuming, when said insertion member is locked, a first position, in which said grasping means hold said connexion element and enable it to be inserted into the corresponding housing of the connector, following the displacement of the body along a direction parallel to said housing, and a second position, in which the grasping means release said connexion element which is then connected in the connector housing.

Thus, after having locked the selected insertion member on the body, as a function of the dimensional characteristics of the connexion element, the mounting operations for grasping and inserting the connexion element into the corresponding connector housing are carried out automatically, which makes it possible to reduce the number of manual operations and to ensure correct connexion of the connexion element into the connector.

Advantageously, said insertion men, bet, once it is locked on the body, projects from said body in order to face the connector to be equipped. Thus, this arrangement greatly facilitates the mounting and dismantling of said members on the body of the device. There is no risk of the body, which is then at a distance from the insertion member carrying the connexion element, damaging the cables already connected to the connectors, during its displacement in the direction of connector in question, parallel to the housing.

Preferably, said body has a hollow and approximately parallelepipedal shape, inside which said means for controlling the means for grasping said insertion member are arranged. The body therefore defines a hollow box, without any external bumps, thereby preventing the already connected cables from becoming entangled thereon. In addition, the control means are then protected inside the body.

In a preferred embodiment, said removable fixing means comprise a tenon and mortise assembly allowing said insertion member to slide on the body, and a ball lock enabling the insertion member to be immobilized in position relative to said body. It will therefore be noted that the production of said fixing members is straightforward, which ensures that they operate reliably during use. More particularly, the tenon/mortise assembly of said insertion member on the body is arranged parallel to the direction of displacement of the body toward the connector, and of mounting of the connexion element into the corresponding housing of said connector.

Structurally, the tenon of said assembly can be provided on a base of said member and has a T-shaped cross section, while the mortise, having a cross section complementary to that of the tenon, is provided on the end of a plate standing out from said body, and the locking ball is housed partially inside the base of said member in order to engage, by virtue of the action of a cam-forming part stressed by a spring and controllable from the outside, in a corresponding recess provided in said plate.

Furthermore, said means for grasping the connexion elements are, for example, of the clamp type and so comprise two jaws which can be displaced in relation to one another, under the action of said control means, between a closed position, in which said connexion element is grasped, held, then introduced into the corresponding housing of the connector, and an open position, in which said element, thus inserted into its housing, is released by said jaws. More particularly, these jaws are mounted about an articulation spindle, parallel to the direction of displacement of the body and of mounting of said connexion elements, and joined up to said control means, and one of said jaws is stationary and solidly fixed to the base of said insertion member, whereas the other jaw is movable and joined up to said articulation spindle. Once again, the straightforward production of said grasping means is noted, which further guarantees a reliable operation.

In addition, said means for controlling said grasping means comprise a motor which is capable of driving said grasping means using a friction mechanism.

In this case, said motor, which is housed inside said body, is placed coaxially to the articulation spindle of said jaws and it interacts with said spindle by means of an intermediate shaft pressed axially against said articulation spindle, and said friction mechanism consists of disks which are respectively provided and associated with the intermediate shaft and with said spindle.

Advantageously, a torsional spring respectively joins up, by means of its ends, the two jaws forming the means for grasping said member, so that said jaws are spontaneously pulled back and held in the closed position when said insertion member is withdrawn from said body.

According to another characteristic of the invention, the device comprises, in addition, means for protecting said connexion element held in said insertion member, said protection means being associated with said body and capable of covering said connexion element until the time when it is to be inserted into the corresponding housing of the connector. In a preferred embodiment, these protection means may comprise two movable shields placed respectively on either side of said insertion member, and capable of assuming, by virtue of actuating means, a remote open position away from said insertion member and a closed position surrounding said connexion element carried by the grasping means. Consequently, these shields prevent the connexion elements, which often have dimensions of the order of millimeters, from being damaged during their approach toward the connector housings. The shields thus force their way through between the already connected cables, after which they are retracted when the connexion element is then facing the corresponding connector housing.

More particularly, the two shields are respectively mounted, via spindles, in symmetrical and converging guiding slots provided in the plate of said body, carrying said insertion member, and said actuating means consist of a jack housed inside said body and driving, via a carriage sliding on said plate, the spindles of said shields between their open position and their closed position, the spindles sliding in the converging slots in the direction of said member.

The present invention furthermore relates to a machine for automatically connecting connexion elements, such as pins, equipping the ends of electrical conductors of cables, into connector housings.

For this purpose, it comprises:

- at least two connecting devices, such as those defined previously and intended to deal respectively with the two connexion elements provided at the ends of each cable, the body of each device intended to carry an insertion member, being capable of being displaced, relative to the frame of the machine, along the OX, OY and OZ axes of an orthonormal reference system;
- a plurality of connectors, the housings of which are intended to receive the corresponding connexion elements, and which are placed on said frame;
- means for visualizing the positions of the connexion elements equipping the respective ends of each cable;
- an area for storing the various insertion members which are capable of being locked to said respective bodies, and which are selected as a function of the geometrical characteristics of said connexion elements to be connected; and
- a programable directing unit containing the information relating to the various connexions to be carried out depending on the connexion elements provided at the end of each cable, and on the housings of said connectors, as well as the types of insertion members to be selected as a function of the connexion elements to be connected, and to which unit are joined up the means for controlling the means for grasping each selected member, and the means for actuating said protection means and the displacements of each body along the OX, OY and OZ axes of said reference system.

Thus, it is understood that the cycle of connecting the connexion elements into the connector housings is automatically controlled and run by the directing unit, from the time when the connexion elements of each cable are grasped by the two connexion devices, until the time when they are inserted into the corresponding housings.

Furthermore, the machine additionally comprises means for successively conveying said cables to be connected, equipped with said connexion elements, in front of said visualizing means, said conveying means being joined up to said programable directing unit. The connexion operations are thus completely automated from the moment when the cables, equipped at their ends with the connexion elements, are removed from the crimping machine. More particularly, said conveying means comprise an endless conveyor on which the two ends of each cable, equipped with said connexion elements, are placed, via clamps associated with the conveyor.

In a preferred embodiment, the body of each device is mounted on a movable part attached to the frame, each of said movable parts comprising a crosspiece which is capable of sliding, along the OX axis of said reference system, on at least one beam solidly fixed to said frame, a carriage mounted so as to slide along the OY axis of said reference system on said crosspiece, and a seat carrying said body and associated with said carriage so as to slide along the OZ axis of said reference system, said connector housings being placed along the OZ axis of said reference system.

In addition, said storage area can consist of two identical boxes in the compartments of which the various insertion members are housed, via supports, each support being provided with controllable arms for holding the corresponding insertion member and with a piston or the like placed so that it projects from the support and against which the cam-forming part of said fixing means, which is attached to the body of each device, is capable of being applied.

A box of insertion members is thus advantageously allocated to each connexion device and each insertion member is capable of being solidly fixed to the body of the corresponding device by means of the tenon-mortise joint and of the ball lock of the fixing means.

Furthermore, said visualizing means comprise for example two cameras associated with the frame and under which the two ends of each cable, provided with said connexion elements, come to a standstill.

DETAILED DESCRIPTION OF THE DRAWINGS

The figures of the attached drawing will clearly reveal how the invention may be produced. In these figures, identical references designate similar elements.

Figure 3:
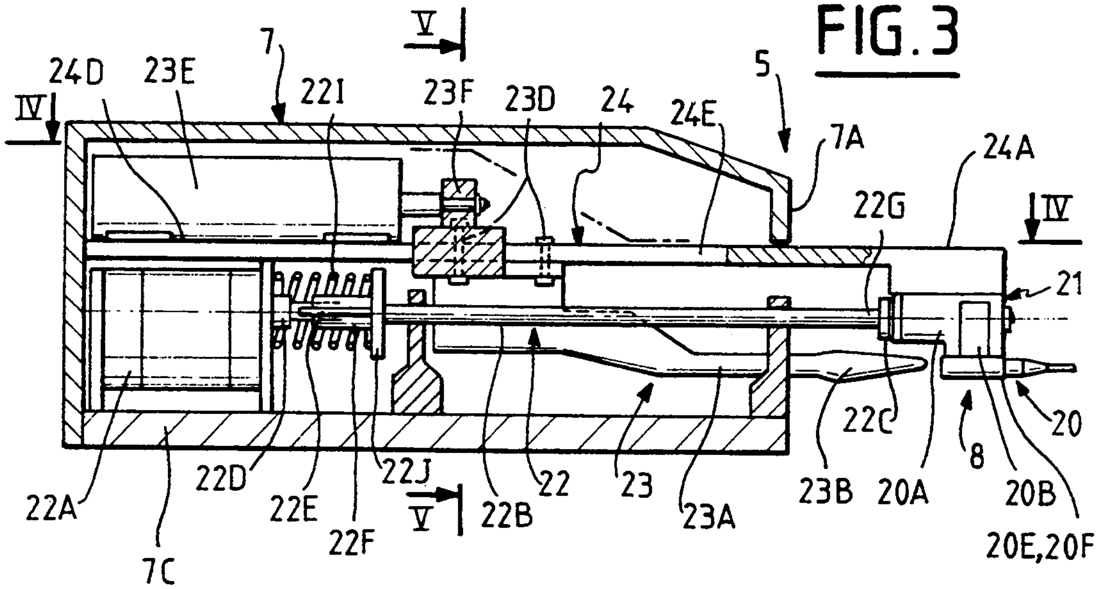
FIG. 3 shows a longitudinal cross section of the device illustrated in FIG. 2, in particular showing the control means for the means for grasping said member and the means for protecting the connexion element grasped by said insertion member, in the inactive remote position.
Figure 4:
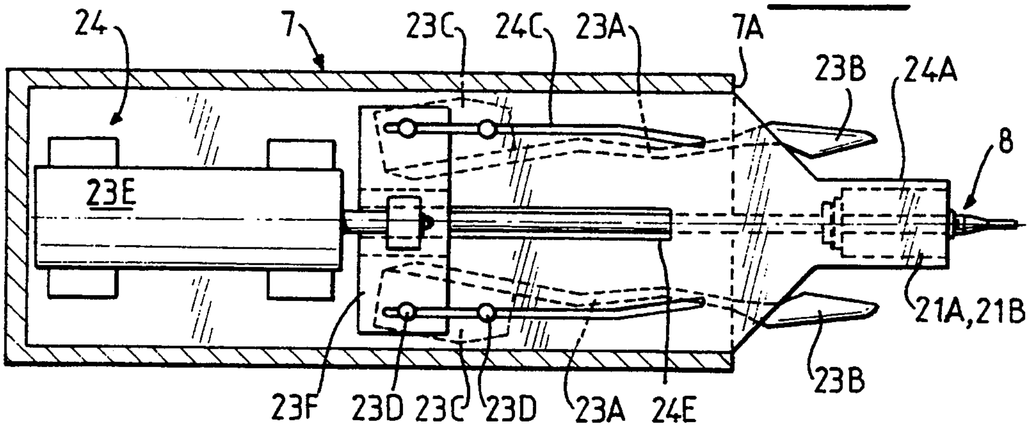
Figure 5:
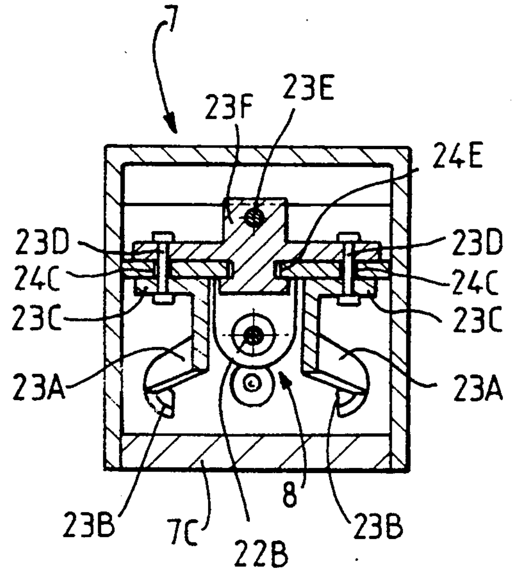

FIGS. 4 and 5 respectively show cross sections of the device along lines IV—IV and V—V in FIG. 3.

Figure 6:
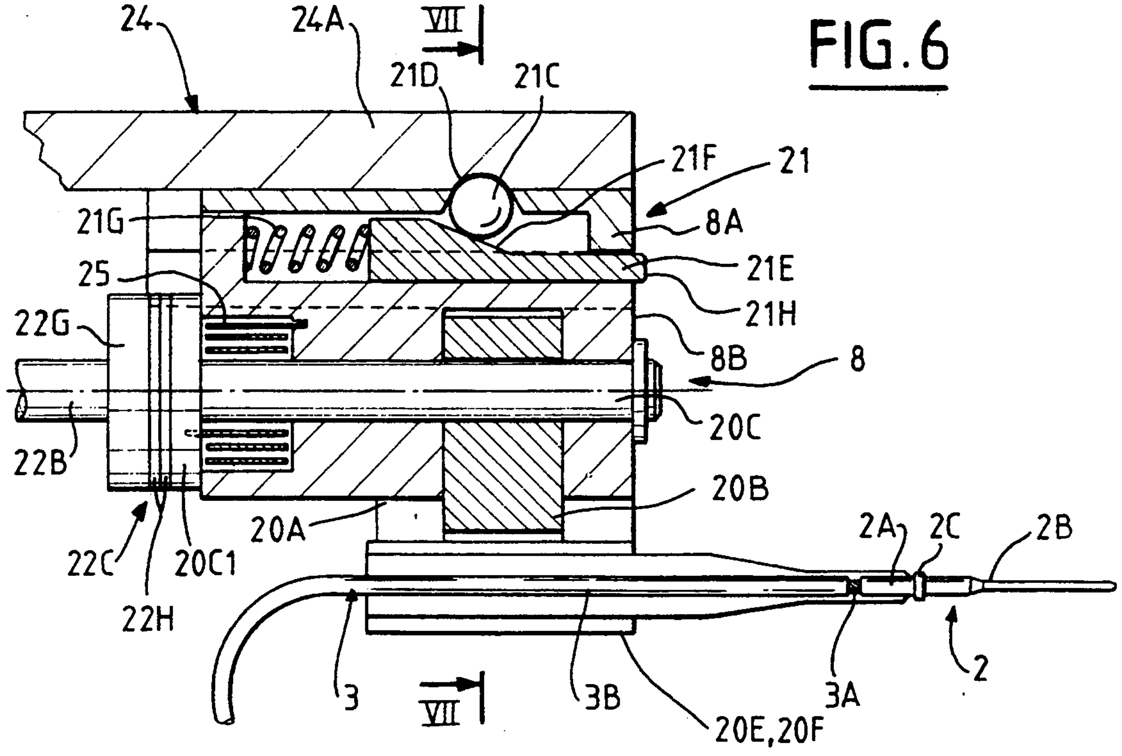

FIG. 6 shows a cross section at a larger scale of said insertion member fixed to the device body and holding, under the action of the grasping means, the end of an electrical cable equipped with the connexion element such as a male pin.

Figure 7:
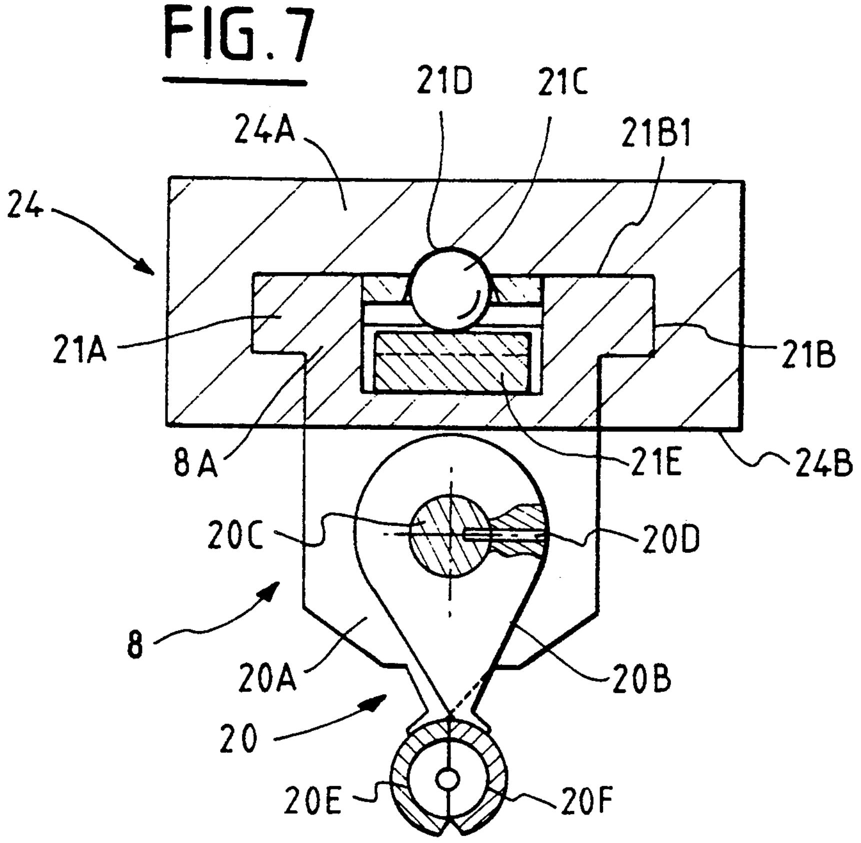

FIG. 7 shows a transverse cross section of said insertion member along line VII—VII in FIG. 6, showing the grasping means in the closed position.

Figure 8:
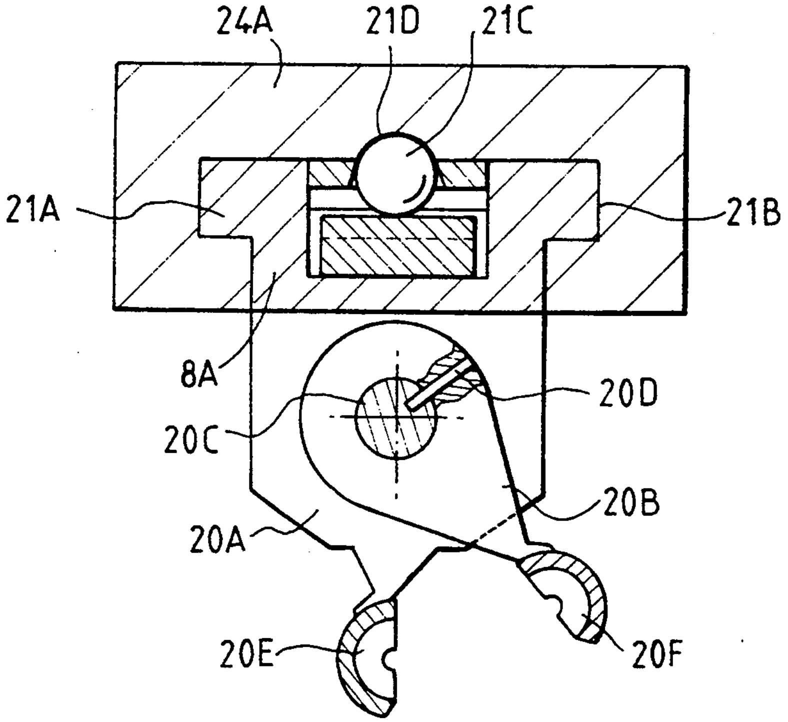

FIG. 8 shows a view similar to the preceding one, but showing said grasping means of said member in the open position under the action of the control means.

FIG. 9 shows one of the two boxes for storing said insertion members provided on the machine.

FIG. 10 shows a perspective view of one of the supports of said insertion members contained inside each box.

Figure 11A:
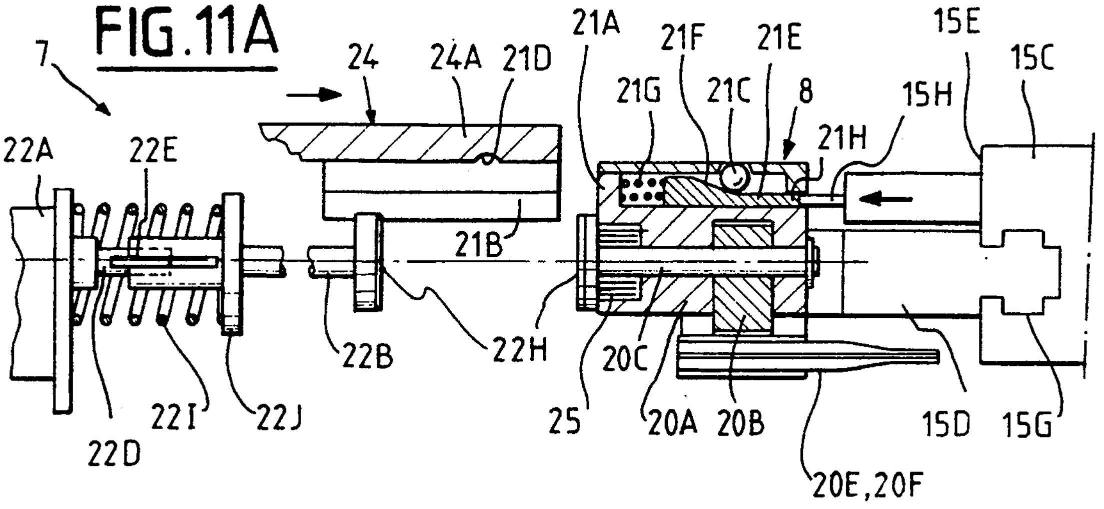
Figure 11B:
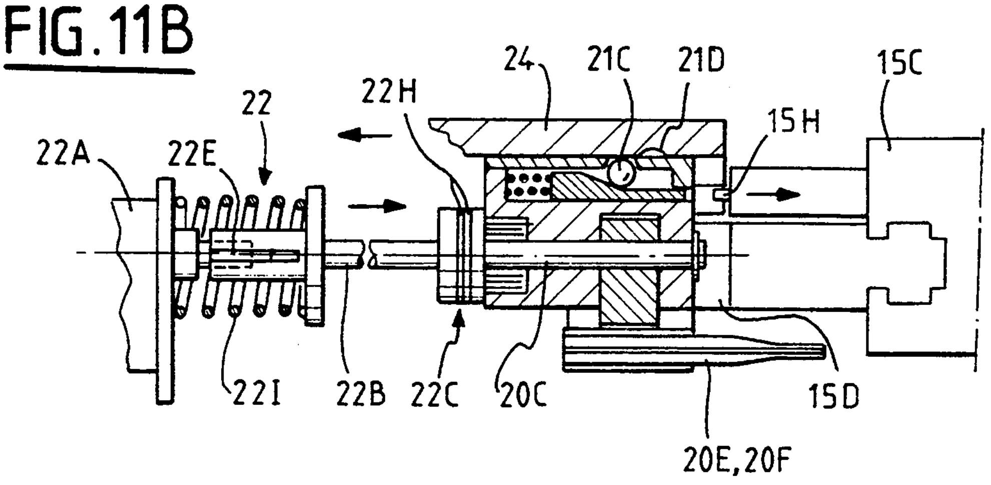
Figure 11C:
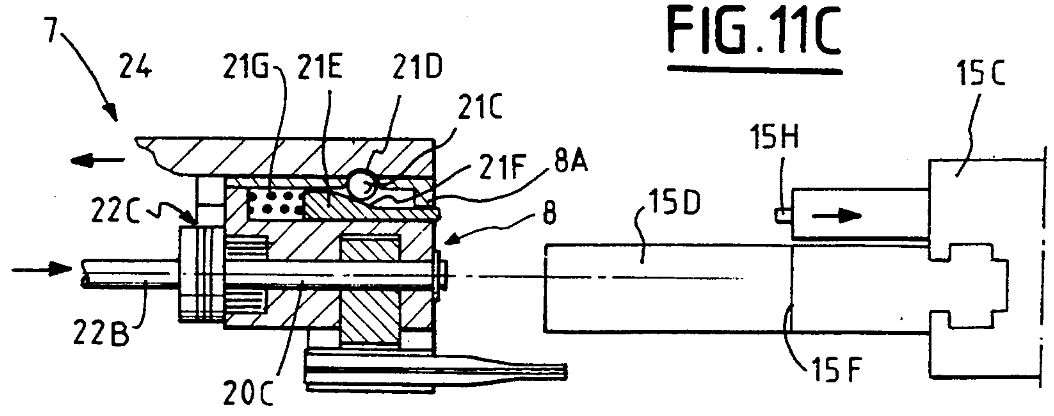

FIGS. 11A, 11B and 11C show partial diagrammatical cross sections showing the three main phases respectively, of advance, of grasping and of retreat, respectively, of said selected insertion member, from its storage compartment to the body of said device.

FIG. 12 shows a view similar to FIG. 3, but it illustrates said device with its member holding the male pin of an electrical cable and with its protection means in the active position, surrounding the pin.

FIGS. 13 and 14 respectively show cross sections of the device along lines XIII—XIII and XIV—XIV in FIG. 12.

FIG. 15A shows the male pin equipping one of the ends of a cable and carried by one of the devices being inserted into the corresponding housing of a connector provided on the machine, while FIG. 15B shows, for example, a female pin equipping the other end of the same cable and carried by the other device being inserted into the corresponding housing of another connector.

FIG. 16 shows, by way of example, a cabling bundle or harness thus obtained.

DETAILED DESCRIPTION OF THE INVENTION

Figure 1:
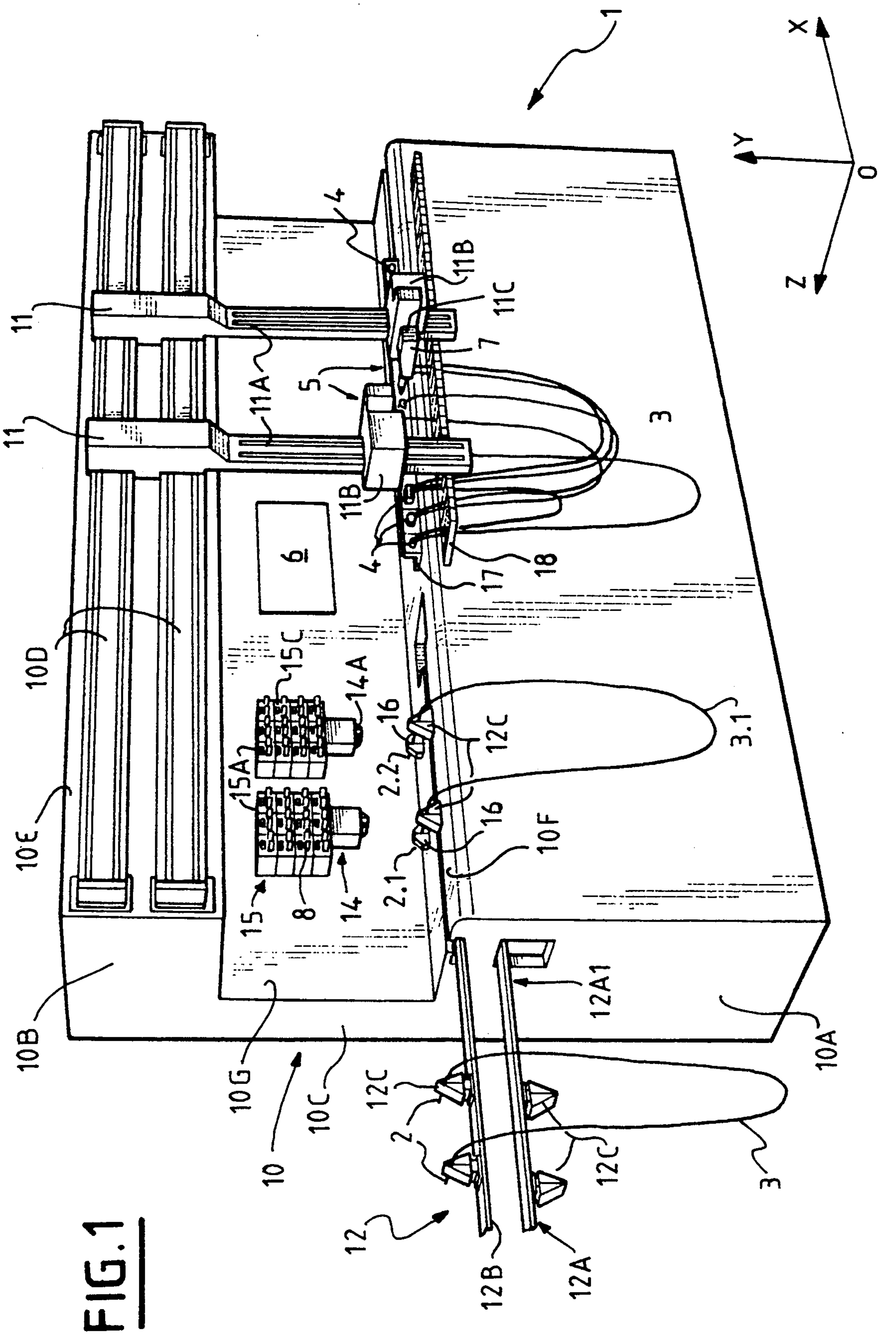
FIG. 1 shows a perspective view of an automatic connexion machine according to the invention, advantageously comprising two connexion devices in accordance with the invention.

The automatic connexion machine 1, shown in FIG. 1, is intended for mounting connexion elements 2, provided at the ends of the electrical conductors of cables 3, into the corresponding electrical connector housings 4, in particular via connexion devices 5 and a programable directing unit 6 symbolized by a rectangle. The connexion elements 2, such as pins, equipping the electrical cables will be more particularly described and illustrated in relation to FIGS. 6, 15A and 15B, these last two figures furthermore showing two of the electrical connectors to be equipped.

In this embodiment, the machine 1 advantageously comprises two connexion devices 5, which can be displaced along the OX, OY and OZ axes of an orthonormal reference system of the machine, and intended to each deal with one of the two connexion elements or pins 2 provided at the ends of each electrical conductor in order to insert them into the corresponding housings of two selected connectors 4. To that end, each of the devices 5, which are identical both structurally and functionally, comprises a body 7 can be displaced along the three axes OX, OY and OZ and an insertion member 8 which is capable of being fixed to the body for grasping, and then inserting said connexion element 2 into the selected housing of the connector 4 in question.

Prior to the description of the devices, which will be further dealt with in relation to FIGS. 2 to 8, the machine 1 is described below, which machine comprises a fixed frame 10, to which the orthonormal reference system OX, OY and OZ relates and which consists of a lower part or base 10A, and of an upper part or portal 10B joined up to one another by a central part 10C which is set back. The machine also comprises movable parts 11 for the displacement of the devices 5 along the OX, OY and OZ axes, means 12 for automatically and successively conveying the cables 3 provided with connexion elements 2, means 14 for visualizing the connexion elements 2 of each cable 3, an area 15 for storing the insertion members 8, and a plurality of connectors 4 to be connected, the housings of which are intended to receive the connexion elements.

More particularly, by referring to FIG. 1, it can be seen that the movable parts 11 for the displacement of the connexion devices 5 are identical and are carried, in this case, by two horizontal beams 10D which are spaced apart and fixed to the front face 10E of the portal 10B of said frame. These parallel beams 10D are identical and placed along the OX axis of the reference system. The movable parts 11 are mounted on these beams via two vertical crosspieces 11A placed along the OY axis of the reference system and capable of sliding along the horizontal beams 10D. The crosspiece 11A of each part supports a carriage 11B capable of sliding on this crosspiece along the OY axis. The two crosspieces are identical, as are the two carriages. A seat 11C which is capable of being displaced along the OZ axis of the reference system is mounted so as to slide on each carriage 11B and carries, via appropriate fixing means not shown in the figure, the body 7 of the corresponding connexion device 5. The displacements of each device 5, carried by its respective seat-carriage-crosspiece part 11, are of course provided by motors, not shown, joined up to the directing unit 6. In addition, the fact that the parts 11 are carried by two beams 10D increases the mechanical stiffness and ensures accurate displacements.

The means 12 for conveying the cables 3 consist for example of an endless belt 12B (or chain) conveyor 12A, on which evenly spaced pairs of clamps 12C are provided and which runs along the OX axis of the machine 1. This endless belt conveyor 12A, the downstream end 12A1 of which is shown in FIG. 1 arriving into the base 10A of the frame, has its upstream end, which is not visible, placed at the output of a crimping machine, for example. This machine places and fixes the suitable connexion elements 2, such as particularly male or female pins, at the ends of the electrical conductors of said cables 3, which have previously been cut to length depending on the distance separating the two connectors to be joined up. Each cable 3, equipped with pins crimped to the ends of the electrical conductor, is automatically placed, via its ends on the consecutive clamps 12C of a same pair provided on the endless belt 12B of the conveyor. Two cables thus clamped on the conveyor 12A are illustrated in FIG. 1.

The means 14 for visualizing the positioning of the connexion elements 2 (pins) consist for example of two cameras 14A placed in parallel approximately above the downstream end 12A1 of the conveyor and associated with the central part 10C of the frame. These cameras 14A, having their axes of sight arranged along the OY axis, make it possible to visualize the connexion elements 2 crimped to the two ends of each electrical cable 3. Furthermore, in order to facilitate the grasping of said connexion elements by the insertion member 8, two controllable identical clamps 16 are provided on the upper face 10F of the base 10A of said free and are used to grasp the connexion elements 2 of each cable, on the basis of the information supplied by the cameras 14A, and to move in translation along the OZ axis in order to stretch the ends of each cable 3, so as to withdraw said connexion elements 2 in a plane perpendicular to the axes of sight of the cameras 14A so that they may thus be grasped by the insertion member 8. By virtue of the cameras 14A which are joined up to the directing unit 6, the positions of the connexion elements are fully known and the grasping of said connexion elements 2, firstly by the clamps 16 and secondly by the jaws 20A and 20B of the insertion member is perfectly controlled, as will be revealed subsequently.

The connectors 4, two of which are more particularly illustrated in relation to FIGS. 15A and 15B, are previously mounted in a line on a suitable support 17, not described, capable of holding any type of connector and fixed to the upper face 10F of the base of said frame. These connectors 4, as shown in FIG. 1, may have a variety of shapes (circular, rectangular, . . . ) and dimensions, and similarly may comprise any number of housings. These housings, designated by 4A in FIGS. 15A and 15B, are arranged along the OZ axis of the machine, thus corresponding to the direction of displacement of the body 7 of each connexion device 5, mounted on the corresponding movable part 11.

As regards the area 15 for storing said insertion members 8, it comprises two identical boxes 15A which are fixed to the front face 10G of the central part 10C of said frame and which have a plurality of compartments 15B. The insertion members 8 are housed respectively in the compartments 15B of each box via respective supports 15C, which will be more particularly described in relation to FIGS. 9 and 10. The insertion members 8 have geometrical characteristics which of course match those of the connexion elements to be grasped, and crimped on the cables. The cameras 14A are located under the two boxes 15A respectively, which makes it possible to limit the displacements of each body from the time when the insertion member is mounted on the body of the corresponding device until the time when the connexion element is grasped.

A box 15A containing the various insertion members adapted to grasp the various connexion elements equipping the corresponding ends of the cables is allocated to each body 7 of the connexion device.

The operation of the machine 1 is run by the programmable directing unit 6 to which the various motors for the movable parts 11 and for the endless conveyor 12A in particular are joined up, and which contains, in addition, the information relating to the types of connexion to be carried out between the connexion elements of the cables and the corresponding housings of the various connectors, and to the types of insertion members to be selected depending on the connexion to be carried out.

Figure 2:
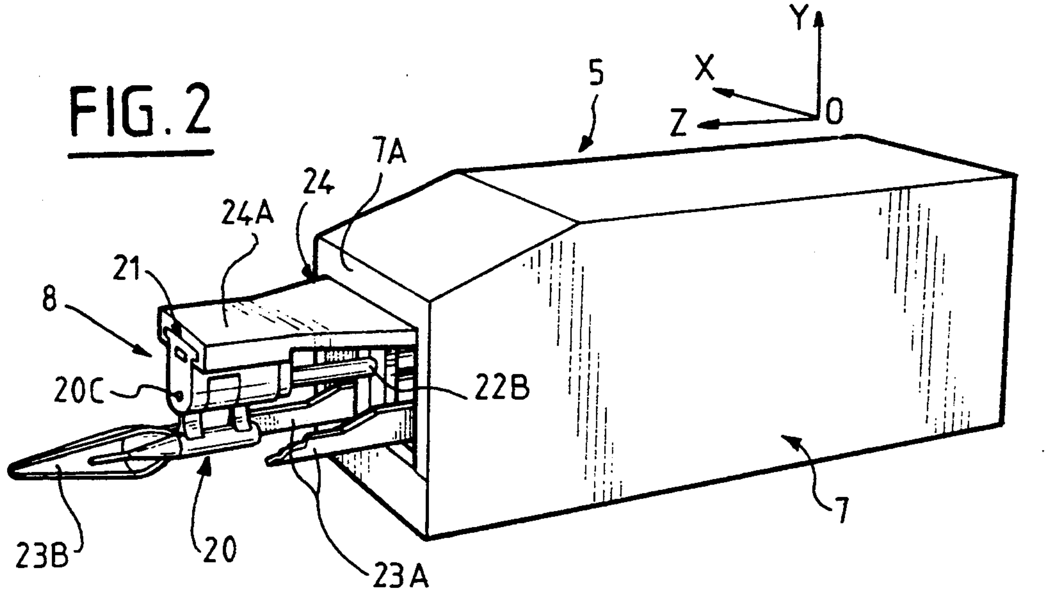
FIG. 2 shows a perspective view of one of the two connexion devices mounted on the machine, the insertion member being locked on the body of said device.

FIG. 2 shows one of the two connexion devices 5 in accordance with the invention. The body 7 of this device, which is fixed to the seat 11C which can be displaced along the direction OZ on the carriage of the corresponding movable part 11, carries one of the insertion members 8 available in the storage area 15 and selected as a function of the connexion to be carried out, that is to say of the geometrical characteristics of the connexion element 2 to be connected. This insertion member 8 is provided with grasping means 20 for grasping the connexion element 2 to be connected, and with removable fixing means 21 which enable it to be locked or unlocked from the body 7. This body has the shape of an approximately parellelepipedal box, inside which are advantageously housed, means 22 for controlling the grasping means 20 and means 23 for protecting the insertion member 8 intended to hold the connexion element 2 during its approach toward the corresponding housing of the connector 4 in question.

As seen in FIGS. 2, 3, 4 and 5, the insertion member 8 of the device, which member is without a connexion element, projects perpendicularly relative to one of the faces of said body 7, that is to say parallel to the direction of displacement OZ. This face thus corresponds to the lateral front face 7A of said body. This cantilever arrangement of said member 8 allows an easy mounting of the latter on the body, as well as of the connexion elements on the member itself, and furthermore holds the body 7 away from said connectors.

More particularly, with regard to FIGS. 2 to 6, a plate 24 is provided inside the body 7, being placed approximately in its median plane, that is to say, in relation to the reference system of FIG. 1, parallel to the XOZ plane. The projecting end 24A of the plate 24 emerges from the lateral front face 7A of the body 7 in order to thus carry, by means of removable fixing means 21, the selected insertion member 8.

In this embodiment, the removable fixing means 21, further shown in FIGS. 2, 6 and 7, consist of a tenon-mortise type assembly ensuring that said member 8 may slide along the OZ axis on the plate 24 of the body and of a ball lock, immobilizing the insertion member 8 in position. The tenon 21A of the assembly is formed on a base 8A of said member and has a T-shaped cross section, while the mortise 21B of complementary shape is provided under the lower face 24B of the projecting end 24A of said plate 24.

The locking in position is obtained by means of the ball 21C partially housed in the base 8A of said member so as to project slightly relative to this base, and thus engaging into a corresponding recess 21D provided in the bottom 21B1 of the mortise 21B. This ball 21C is held engaged in the recess 21D by means of a component 21E having a sloping portion 21F on which the ball rests, said component being subjected to the action of a compression spring 21G acting along the OZ axis. It is therefore understood that under the action of the spring 21G, the ball 21C is pushed into the corresponding recess 21D, via the component 21E with the sloping portion. It is noted that the end 21H of the component 21E, opposite to that subjected to the action of the spring, projects slightly relative to the front face 8B of the insertion member. This arrangement makes it possible, as will be revealed subsequently, to unlock and to dismantle the insertion member 8 from said body 7.

In addition, the grasping means 20 of each member 8 are of the clamp type and for this purpose comprise two jaws 20A and 20B, which are articulated about a spindle 20C parallel to the OZ axis of the reference system and therefore to the sliding motion defined by the tenon-mortise assembly. Referring to FIGS. 1, 6 and 7, one of the jaws 20A is, in this embodiment, stationary and solidly fixed to the base 8A of the insertion member, in such a way that this base 8A and the jaw 20A make up only the one piece, whilst the other jaw 20B is movable and joined in rotation to the articulation spindle 20C by a peg 20D placed radially as seen in FIG. 7. Each insertion member 8 consists then mainly of two jaws, one of which is solidly fixed to the base and to the articulation spindle. The grasping grips 20E and 20F, provided at the end of the jaws 20A and 20B respectively, are identical and each have the shape of a semi-cylindrical cover. These grips 20E and 20F are parallel to each other and to the OZ axis and they grasp the connexion elements 2, the geometrical characteristics of which correspond of course to those of the selected insertion member. For example, it can be seen in FIG. 6 that the grips of the jaws 20A and 20B hold the rear part 2A of a male pin 2 which is crimped on the bare end of the electrical conductor 3A of a cable 3. The end 3B of this cable is, in addition, guided by the grips of said jaws, by virtue of their elongate shape. The front part 2B of the pin, which is intended to be connected into the corresponding housing of a connector and which is separated from the rear part by a rib 2C, is thus placed strictly parallel along the OZ axis.

The means 20 for grasping each insertion member 8 may be actuated by the control means 22. To that end, and referring in particular to FIGS. 3 and 6, it can be seen that the means 22 comprise an electric motor 22A joined up to the directing unit 6 and capable of driving, through an angular arc, the articulation spindle 20C of said grasping means via an intermediate shaft 22B and a friction mechanism 22C. More particularly, the electric motor 22A is of the step-type and is fixed to the bottom 7C of the body 7. The end 22F of the intermediate shaft 22B is coupled to the output shaft 22D of said motor, by means of a fluted joint 22E, the other end 22G of the intermediate shaft interacting with the articulation spindle 20C by means of the friction mechanism. The output shaft 22D of the motor, the intermediate shaft 22B and the articulation spindle 20C are aligned and coaxial, parallel to the OZ axis of the reference system. As regards the mechanism 22C, it comprises two disks 22H, one of which is associated with the other end 22G of the intermediate shaft, and the other being fixed to the widened corresponding end 20C1 of the articulation spindle 20C. The two disks 22H are pressed against each other by means of a compression spring 22I provided between the motor 22A and a flange 22J of the intermediate shaft, in such a way that the latter is constantly pressed toward the articulation spindle 20C of said grasping means.

As seen in FIGS. 6 and 7, the movable jaw 20B and the stationary jaw 20A are held in the closed position by means of a torsional spring 25, one of the ends of which is joined to the stationary jaw 20A, while the other end is fixed to the friction disk 22H which is solidly fixed to the articulation spindle 20C of said grasping means, to which the movable jaw 20B is solidly fixed by means of the peg 20D. The electric step motor 22A then assumes a first position, in which the grips 20E and 20F of said jaws are pressed against each other. It is therefore understood that, when the motor 22A is actuated, the articulation spindle 20C is driven through a predetermined angular arc, by means of the intermediate shaft 22B and the friction disks 22H, the transmitted force of which exceeds that of the torsional spring. The movable jaw 20B connected in rotation with the spindle 20C pivots with the latter, such that its grip 20F moves away from the grip 20E of the stationary jaw 20A. The motor 22A then assumes a second position, in which the jaws make it possible to release the connexion element 2, then connected in the connector housing, or to grasp one of the connexion elements of another cable provided on the conveying means.

Referring in particular to FIGS. 3, 4 and 5, it can be seen that the means 23, making it possible to protect the connexion element 2 grasped by the insertion member 8, comprise two identical movable shields 23A, placed symmetrically on either side of said insertion member 8 locked on the plate 24 by the fixing means 21. More particularly, the shields 23A have, at their front ends, a shell shape 23B making it possible to cover the connexion element 2 by the insertion member 8, as will be seen in particular with regard to FIGS. 12 to 14. The rear ends of the shields 23A end in the shape of flat wings 23C which are applied under the lower face of said plate 24. The shield wings 23C are then joined to the plate by means of spindles 23D, two per wing, respectively passing through two slots 24C formed in the plate. These slots 24C are symmetrical to each other in relation to the median longitudinal axis of the plate, parallel to the OZ axis, and converge in the direction of the front face 7A of the body 7, that is to say toward the insertion member 8.

The displacement of the shields in the slots of the plate is carried out by actuating means, such as a jack 23E fixed to the upper face 24D of the plate 24 and controlled by the programable directing unit 6. The rod of the jack 23E carries at its end a carriage 23F which is joined up to the wings 23C of the shields 23A via one of the two spindles 23D of each wing, passing through the slots 24C, and which is mounted so as to slide in a groove 24E formed in the plate 24 along its median longitudinal axis, parallel to the OZ axis. The slots 24C, which are advantageously converging, thus enable the shields 23A to pass, by means of the spindles 23D which follow the path imposed by the slots, from a retracted open position away from said insertion member 8 (FIGS. 3 to 5), to a closed position (FIGS. 12 to 14) in which said shells 23B cover the connexion element, under the action of the jack 23E pushing the carriage 23F which, in turn, displaces the shields by means of the spindles 23D.

It will also be noted that the shields 23A, with the exception of their front ends 23B, and the control jack 23E are advantageously housed inside the body 7, thus being protected therein, in the same way as the control means 22.

In addition, FIG. 9 shows one of the two boxes 15A in the compartments 15B of which the various available insertion members 8 are housed, via supports 15C respectively. The dimensional characteristics of the grasping grips 20E, 20F are different for each member and are consequently adapted to the dimensional characteristics of the various connexion elements 2 to be connected. Each insertion member 8 is held by its support 15C, the external parllelepipedal shape of which corresponds to the internal shape of the compartment 15B, and which is mounted in the latter along a direction parallel to the OZ axis. Referring more particularly to FIG. 10 which shows one of the supports, it can be seen that two arms 15D, spaced apart and parallel to one another, project relative to the visible front face 15E of each support 15C, parallel to the OZ axis. The insertion member 8, the front face 8A of which is then turned toward the shoulders 15F provided symmetrically in the arms 15D, is able to be inserted and held between these two arms. To that end, these arms are mounted so as to slide by means of their rear ends, in a groove 15G having a cross-shaped cross section and made parallel to the OX axis of the reference system in the front face 15E of the support. The arms 15D are thus properly joined to the support and may in addition slide in opposite directions in the groove 15G, by virtue of motor means which are not shown. The two arms move toward one another, under the action of the motor means, in order to hold the insertion member 8 tightly in position.

In addition, it can be seen in this FIG. 10 that a controllable piston 15H also projects relative to the front face 15H of each support, above and between the two arms 15D. The arrangement of this piston 15H is such that, when the insertion member is carried by the arms 15D, the end 21H of the component 21E faces this piston, as will be seen more particularly with regard to FIGS. 11A to 11C.

The operation of the automatic connexion machine 1, equipped with the two devices 5, will now be described.

Firstly, it has been assumed in FIG. 1 that cables 3 are already connected by means of their connexion elements 2 in the specific connectors 4. These connexions have been carried out by the devices, as a function of the information contained and issued by the directing unit 6, which devices thus simultaneously deal with the two connexion elements equipping each cable respectively. In order to avoid the connected cables becoming entangled with each other, a grid 18 is fixed to the base 10A of the frame just below the support 17 of the connectors 4. The cables 3 can thus be better organized.

It has been furthermore assumed that the next operation cycle of the machine consists in connecting the pins 2.1 and 2.2 equipping the cable 3.1, which is conveyed by the endless conveyor 12A and the pins of which are placed within the field of vision of the cameras 14A. These cameras make it possible to accurately detect the position of the pins 2.1 and 2.2 so that the directing unit 6 may control the grasping of said pins by the clamps 16, in order to withdraw them from the clamps 12C and to stretch the ends of the cable 3.1 on which said pins are crimped. Depending on the order in which the cables arrive, the directing unit 6 determines, by means of the data stored in its memory, on the one hand, the two connectors 4 intended to receive the two pins 2.1 and 2.2 respectively and, on the other hand, the insertion meanders 8 to be mounted into the two bodies 7 of said devices, these members depending on the geometrical characteristics of the pins 2.1 and 2.2.

The two insertion members 8, having been used to plug the pins of the preceding cable, have been, for example, put back in the corresponding supports 15C of the boxes by means of the displacements of the movable parts 11. The mounting of the selected insertion member 8 into its body will be described below with regard to FIGS. 11A, 11B and 11C. Needless to say, in the event of one or both insertion members used previously corresponding to both following pins to be grasped, the devices 5, carried and displaced by the movable parts 11, position themselves directly above the clamps 16 so as to grasp the ends of the cable.

As shown in FIG. 11A, the body 7 of each device is conveyed, by means of suitable displacements along the OX, OY and OZ axes of the corresponding movable part 11, to face the insertion member 8 to be used as a function of the characteristics of the pins. Thus, the mortise 21B provided in the plate 24 of the body faces the tenon 21A of the insertion member, and the axis which is common to the motor 22A and to the intermediate shaft 22B is coaxial with the articulation spindle 20C. It will also be noted that the spring 22I is then relaxed, pushing the intermediate shaft 22B slightly away from the output shaft 22D of the step motor 22A.

As regards the insertion member 8, it is clamped by the two arms 15D of the support 15C, and the piston 15H is in the projecting position, such that the component 21E of the fixing means 21 compresses the spring 21G, thereby causing the ball 21C to move downward as a result of the displacement of the sloping portion 21F. The ball 21C is then embedded in the base 8A or the tenon 21A of the insertion member. In addition, the jaws 20A and 20B of the grasping means are in the closed position under the action of the torsional spring 25.

The body 7 via the seat 11C of its movable part 11, is displaced along the OZ axis (FIG. 11A to FIG. 11B), in such a way that the mortise 21B slides on the tenon 21A of the member.

At the same time, the disk 22H of the friction mechanism, joined to the intermediate shaft 22B, presses against the disk 22H joined to the articulation spindle 20C. The displacement along the OZ axis of said body continues until the spring 22I is compressed by the retreat of the intermediate shaft 22B, since the insertion member 8 is held in position by the arms 15D. The shaft 22B is able to slide on the output shaft 22D of the motor 22A by means of the fluted joint 22E. In the position shown in FIG. 11B, it can be seen that the engagement of the tenon 21A of the member 8 in the mortise 21B of the body 7 is such that the ball 21C has passed over the recess 21D provided in the plate 24 by virtue of the projecting position of said piston 15H. At this time, this piston is controlled in order to pass to its retracted position, then the arms 15D release their pressure on the insertion member which is held by the intermediate tenon-mortise joint on the body 7.

The seat 11C of the movable part 11 retreats in the opposite direction along the OZ axis, such that the insertion member 8 is then pushed, under the action of the spring 22I, toward the outside until the point when the ball 21C engages in the recess 21D of the plate 24 under the action of the spring 21G which forces the ball to project outward by means of the sloping portion of the component 21E.

The devices 5, the insertion members of which are locked to the respective bodies, are displaced toward the pins 2.1 and 2.2 which are crimped on the electrical conductor of the cable 3.1, on instructions sent by the directing unit 6 to the corresponding movable parts 11. Beforehand, the jaws 20A and 20B of each insertion member 8 pass from the closed position to the open position, as illustrated in regard of FIG. 8. To that end, the electric step motor 22A, controlled by the unit 6, drives, by means of the intermediate shaft 22B and the friction disks 22H, the articulation spindle 20C in rotation through a suitable angle, thereby moving the grip 20F of the movable jaw 20B away from the grip 20E of the stationary jaw 20A. By means of the information supplied by the cameras 14A relating to the actual positions of the pins 2.1 and 2.2, the directing unit instructs each device 5 which thus positions itself above the corresponding pin of the cable, which pin is then grasped by the jaws of the grasping means 20.

The movable jaw 20B of each insertion member passes to the closed position under the action of the control means 22, such that the grips 20E and 20F of the grasping means 20 grasp their allocated respective pins 2.1 and 2.2, in the manner shown in FIG. 6. The clamps 16, as well as the clamps 12C of the conveyor 12A, controlled by the directing unit 6, then release the ends of the cable 3.1, fitted with the pins 2.1 and 2.2.

The two devices 5 are then displaced along the axes of the reference system toward the two connectors 4 to be connected, such as, for example, the connectors 4.1 and 4.2 shown in FIGS. 15A and 15B respectively. Prior to the insertion phase which will be described subsequently with regard to these figures, the means 23 for protecting each device 5 are employed under the control of the unit 6 because of the abovementioned risks of damaging the pins. To that end, as can be seen in FIGS. 12, 13 and 14, as soon as the operation cycle reaches the phase in which the pins approach, along the OZ axis, the corresponding connector housings, the jack 23E of each device is actuated such that the spindles 23D joining up the carriage 23F to the two retractable shields 23A slide into the slots 24C of the plate and, by virtue of the converging shape of said slots, drive the shields toward each other until the shells 23B of these shields surround the pin held by the grips of the grasping means. Each pin is thus efficiently protected by the shield shells, which force their way, along the OZ axis, through the already connected cables 3. When the approach phase is completed, the rod of each jack 23E is brought back to the withdrawn position, resulting in the retreat of the carriage 23F and of the shields 23A guided, by means of the spindles 23D, through the slots 24C, so as to move apart and to retreat away from the insertion member 8. The shields are thus returned to the retracted withdrawn position.

Each device 5 is then controlled along the OZ axis so as to carry out the connexion proper. More particularly, as shown in FIGS. 15A and 15B, it is assumed, by way of example, that the connectors 4.1 and 4.2 are of the circular type, and male and female respectively. Thus, it can be seen in FIG. 15A that one of the male pins 2 is already inserted in its housing 4A while being held there axially, in the ordinary manner, by the elastic tabs 4B1 of a socket 4B which forces the rib 2C of the pin against the shoulder 4C provided in each housing 4A of the connector. The insertion member 8 of the device is in the course of being displaced along the OZ axis, such that, at this moment, the male pin 2.1 provided at this end of the cable 3.1 is practically engaged in its housing, the rib 2.1C moving the elastic tabs of the socket 4B apart before this socket axially holds the pin 2.1. The front of the grips 20E and 20F is partially engaged in the housing. A check on the force throughout the insertion phase makes it possible to detect the instant when the pin comes to bear against the shoulder 4C of the housing. The socket 4B then locks the corresponding pin. The device 5 is brought back, along the OZ axis but in the opposite direction, out of the connector. As soon as the insertion member 8 is at a sufficient distance, the step motor 22A, controlling the grasping means, is actuated through a given opening angle, simultaneously causing the intermediate shaft 22B and the friction disks 22H to rotate, which causes the movable jaw 20B to move away from the stationary jaw 20A, and thus frees the corresponding end of the cable from said insertion member 8.

The connexion of the female pin 2.2, equipping the other end of the cable 3.1, into the corresponding housing of the connector 4.2 is carried out in the same manner, as is the freeing of this cable end from said insertion member 8.

At this stage, a new connexion cycle can start. To that end, the two devices 5 are displaced, by means of the parts 11, toward the conveyor 12A in order to deal with a new cable 3 or, if the connexion elements 2 are different from those dealt with previously, toward the storage locations 15A, in order to change the insertion members 8.

When all the cables are connected, all the connectors 4 thus equipped are sent to a so-called "routing" machine, which is intended to shape the cabling bundle 30 obtained automatically, such as that shown by way of example in FIG. 16.

What is claimed is:

1. A device for inserting connexion elements of electrical conductors, into connector housings, which comprises:

(a) a body (7) which can be displaced toward the corresponding housing of said connector (4);

(b) at least one insertion member (8) provided with means (20) for grasping said connexion element (2) to be inserted into the corresponding housing (4A) of the connector;

(c) means (21) for fixing said insertion member to said body, allowing locking or unlocking of said member relative to said body;

(d) means (22) for controlling said grasping means (20), associated with said body and capable of assuming, when said insertion member (8) is locked, a first position, in which said grasping means (20) holds said connexion element (2) and enables it to be inserted into the corresponding housing of the connector, and a second position, in which the grasping means release said connexion element which is then connected in the connector housing; and (e) said fixing means (21) being removable and comprising a tenon (21A) and mortise (21B) assembly allowing said insertion member (8) to slide on the body (7), and a ball lock (21C) enabling the insertion member to be immobilized in position relative to said body.

2. The device as claimed in claim 1, wherein said insertion member (8), once it is locked on the body, projects from said body (7).

3. The device as claimed in claim 1, wherein said body (7) has a hollow and approximately parallelepipedal shape, inside of which said means (22) for controlling the means (20) for grasping said insertion member are arranged.

4. The device as claimed in claim 1, wherein the tenon/mortise assembly of said insertion member on the body is arranged parallel to the connexion element (2) to be inserted of said connector.

5. The device as claimed in claim 1, wherein the tenon (21A) of said assembly is provided on a base (8A) of said member and has a T-shaped cross section, while the mortise (21B) is provided on the end (24A) of a plate (24) standing out from said body, and wherein the locking ball (21C) is housed partially inside of the base (8A) of said member in order to engage, by action of a camforming part (21E) stressed by a spring (21G) and controllable from outside, in a corresponding recess (21D) provided in said plate (24).

6. The device as claimed in claim 1, wherein said means (20) for grasping the connexion elements (2) are clamping means and comprise two jaws (20A, 20B) which can be displaced in relation to one another, under the action of said control means (22), between a closed position, in which said connexion element is grasped, held, then introduced into the corresponding housing of the connector, and an open position, in which said element, thus inserted into its housing, is released by said jaws.

7. The device as claimed in claim 6, wherein said jaws (20A, 20B) are mounted about an articulation spindle (20C), parallel said connexion element to be inserted, and joined up to said control means, and wherein one of said jaws (20A) is stationary and solidly fixed to be the base (8A) of said insertion member, whereas the other jaw (20B) is movable and joined up to said articulation spindle (20C).

8. The device as claimed in claim 6, wherein a torsional spring (25) respectively joins up, by means of its ends, the two jaws (20A, 20B) forming the means for grasping said member, so that said jaws are spontaneously pulled back and held in the closed position when said insertion member is withdrawn from said body.

9. The device as claimed in claim 1, wherein said means (22) for controlling said grasping means (20) comprises a motor (22A) which is capable of driving said grasping means using a friction mechanism (22C).

10. The device as claimed in claim 9, wherein said grasping means (20) comprises two jaws (20A, 20B) which can be displaced in relation to one another about an articulation spindle (20C) parallel to said connexion element to be inserted, wherein said motor (22A), which is housed inside of said body (7), is placed coaxially to the articulation spindle (20C) of said jaws and it interacts with said spindle by means of an intermediate shaft (22B) pressed axially against said articulation spindle, and wherein said friction mechanism consists of disks (22H) which are respectively provided and associated with the intermediate shaft and with said spindle.

11. The device as claimed in claim 1, which comprises, in addition, means (23) for protecting said connexion element held in said insertion member, said protection means (23) being associated with said body (7) and capable of covering said connexion element (2) until the time when it is to be inserted into the corresponding housing (4A) of the connector (4).

12. The device as claimed in claim 11, wherein said protection means (23) comprises two movable shields (23A) placed respectively on either side of said insertion member (8), and capable of assuming, by virtue of actuating means (23E), a remote open position away from said insertion member and a closed position surrounding said connexion element carried by the grasping means.

13. The device as claimed in claim 12, wherein the two shields (23A) are respectively mounted, via spindles (23D), in symmetrical and converging guiding slots (24C) provided in said body, carrying said insertion member, and wherein said actuating means consists of a jack (23E) housed inside of said body (7) and driving, via a sliding carriage (23F), the spindles (23D) of said shields (23A) between their open position and their closed position, said spindles sliding in the converging slots in the direction of said member.

* * * * *

UNITED STATES PATENT AND TRADEMARK OFFICE

CERTIFICATE OF CORRECTION

PATENT NO. : 5,333,374

DATED : Aug. 2, 1994

INVENTOR(S) : Pittau

It is certified that error appears in the above-identified patent and that said Letters Patent is hereby corrected as shown below:

In the title page, at [73] Assignee: delete "Societe Nationale Industrielle et Aerospatiale" and insert --Aerospatiale Societe Nationale Industrielle--

Signed and Sealed this

Fourth Day of October, 1994

Attest:

BRUCE LEHMAN

*Attesting Officer* *Commissioner of Patents and Trademarks*